UNITED STATES PATENT OFFICE.

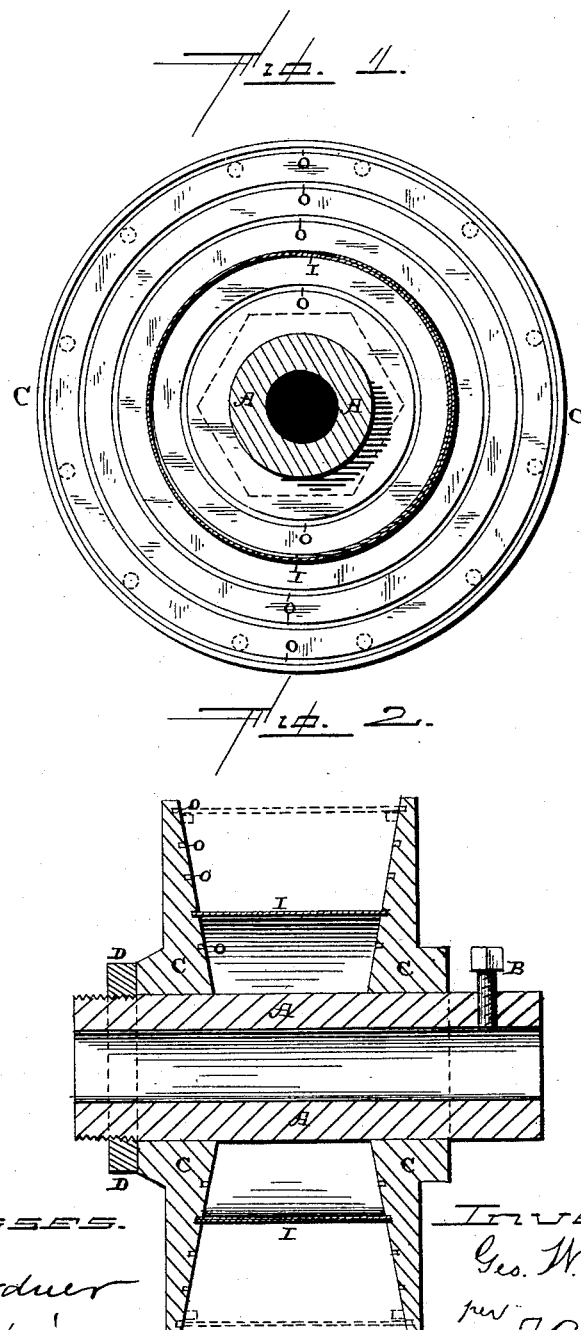

GEORGE W. THOMPSON, OF SHICKSHINNY, PENNSYLVANIA.

PULLEY.

SPECIFICATION forming part of Letters Patent No. 327,120, dated September 29, 1885.

Application filed August 24, 1885. (No model.)

*To all whom it may concern:*

Be it known that I, GEORGE W. THOMPSON, of Shickshinny, in the county of Luzerne and State of Pennsylvania, have invented certain new and useful Improvements in Pulleys; and I do hereby declare the following to be a full, clear, and exact description of the invention, such as will enable others skilled in the art to which it pertains to make and use it, reference being had to the accompanying drawings, which form part of this specification.

My invention relates to an improvement in pulleys; and it consists in the combination of a sleeve which is to be secured upon the shaft, two heads which are placed upon the sleeve, a clamping-nut or other holding device, and an adjustable rim, which can be expanded and contracted according to the size of the pulley desired, as will be more fully described hereinafter.

The object of my invention is to produce an expansible pulley in which the rim can be expanded or contracted so as to vary the size of the pulley at will.

In the accompanying drawings, Figure 1 represents a vertical section of a pulley embodying my invention. Fig. 2 is a similar view taken at right angles to Fig. 1.

A represents a sleeve, which is to be passed over the shaft and secured thereto by means of the set-screw B. Upon this sleeve are placed the two heads C, one or both of which can be moved into any desired relation to each other, and clamped rigidly in place by means of the nut D, which is applied to the screw-threaded end of the sleeve. By screwing up upon this nut after the rim has been adjusted into position the heads can be forced against the opposite edges of the rim, so as to clamp it rigidly in position between them.

When it is desired to either expand or contract the rim, this nut is loosened and the outer one of the heads is either loosened or removed until the rim has been placed in its proper position, and then the nut is tightened up so as to secure the head in place.

Upon the inner side of each one of the heads is formed a series of concentric grooves, O, or a series of pins or flanges, which are concentrically arranged, and which grooves, pins, or flanges serve to support the expansible rim I in any desired position. The rim I is formed from flexible metal of any kind which can be made to have its edges catch in the grooves or over the pins or flanges, and thus vary the size of the pulley to any desired degree. Where the rim is contracted so as to form a small pulley, its ends will overlap; but where a pulley of the largest size is formed, its ends will either meet, and thus form a perfect circle, or slightly overlap, as may be preferred.

By means of the construction above described a flanged pulley of any desired size can be formed at any time, and thus prevent the necessity of purchasing pulleys of different sizes.

Having thus described my invention, I claim—

1. A pulley composed of separate heads and an expansible rim, substantially as shown.

2. The combination of a sleeve, heads which are applied to these sleeves and provided with grooves, pins, or flanges, and an expansible rim which is clamped between the heads, and a clamping-nut for tightening the heads against the rim, substantially as specified.

In testimony whereof I affix my signature in presence of two witnesses.

GEORGE W. THOMPSON.

Witnesses:
 CHAS. A. BOONE,
 JESSE BEADLE.